United States Patent
Thomas

(10) Patent No.: US 12,052,366 B2
(45) Date of Patent: Jul. 30, 2024

(54) TELEPHONY OUTAGE HANDLING USING AN ON-PREMISES TELEPHONY NODE

(71) Applicant: Zoom Video Communications, Inc., San Jose, CA (US)

(72) Inventor: George Thomas, Pleasanton, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 263 days.

(21) Appl. No.: 17/515,135

(22) Filed: Oct. 29, 2021

(65) Prior Publication Data

US 2023/0137507 A1    May 4, 2023

(51) Int. Cl.
*H04L 9/32* (2006.01)
*H04L 9/40* (2022.01)
*H04L 67/1001* (2022.01)
*H04L 67/55* (2022.01)

(52) U.S. Cl.
CPC .......... *H04L 9/3226* (2013.01); *H04L 63/083* (2013.01); *H04L 67/1001* (2022.05); *H04L 67/55* (2022.05)

(58) Field of Classification Search
CPC ...... H04L 9/3226; H04L 63/083; H04L 67/55
See application file for complete search history.

(56) References Cited

U.S. PATENT DOCUMENTS

| | | | | |
|---|---|---|---|---|
| 6,609,197 | B1* | 8/2003 | Ketcham | H04L 63/20 713/182 |
| 6,700,970 | B1* | 3/2004 | Aronson | H04M 3/42314 379/225 |
| 2002/0196777 | A1* | 12/2002 | Wu | H04L 9/40 379/82 |
| 2004/0214569 | A1* | 10/2004 | Cardina | H04W 84/14 455/423 |
| 2007/0054660 | A1* | 3/2007 | Cardina | H04B 1/74 455/404.1 |
| 2010/0054159 | A1* | 3/2010 | Zhu | H04M 3/42374 370/352 |
| 2013/0235985 | A1* | 9/2013 | Christoff | H04M 7/0069 379/90.01 |
| 2014/0140196 | A1* | 5/2014 | Layman | H04L 41/0659 370/216 |
| 2017/0163811 | A1* | 6/2017 | Barkan | H04M 7/0033 |
| 2020/0314247 | A1* | 10/2020 | Klingler | H04M 3/54 |

OTHER PUBLICATIONS

Daniel Harris, "3 Ways to Keep Your VoIP Service From Going Down With the Internet", Retrieved From https://www.softwareadvice.com/resources/3-ways-to-keep-your-voip-service-from-going-down-with-the-internet/, Published Apr. 27, 2017 (Year: 2017).*

(Continued)

*Primary Examiner* — Chau Le
(74) *Attorney, Agent, or Firm* — Young Basile Hanlon & MacFarlane, P.C.

(57) ABSTRACT

A client device determines that a telephony outage is occurring. The client device connects to an on-premises telephony node using an encrypted password at the client device. The client device accesses a set of telephony services via the on-premises telephony node.

20 Claims, 9 Drawing Sheets

(56) References Cited

OTHER PUBLICATIONS

On-Premise Phone Systems vs. Cloud Phone Systems: Which is Best Suited for Your Business? Intermedia Cloud Communications, https://www.intermedia.come/blog/on-premise-phone-systems-vs-cloud-phone-systems-which-is-best-suited-for-your-business/, Oct. 13, 2021, 8 pages.
IBM, High availability and disaster recovery for your on-premises app, select the topology that best meets your needs for business continuity and operational flexibility, Logan Vadivelu and Eduardo Patrocinio, https://www.ibm.com/garage/method/practices/manage/hadr-on-premises-app/, Oct. 13, 2021, 9 pages.
Computing, Springer=Verlag 1999, Load Balancing in Distributed Parallel Systems for Telecommunications, V. Sinkovic, I. Lovrek, Zagreb and G. Nemeth, Budapest, Dec. 23, 1998, 18 pages.
International Search Report and Written Opinion mailed on Jan. 25, 2023 in corresponding PCT Application No. PCT/US2022/047553.

\* cited by examiner

TELEPHONY OUTAGE HANDLING USING AN ON-PREMISES TELEPHONY NODE

FIELD

This disclosure relates to handling telephony outages, such as those that may occur with telephony services implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
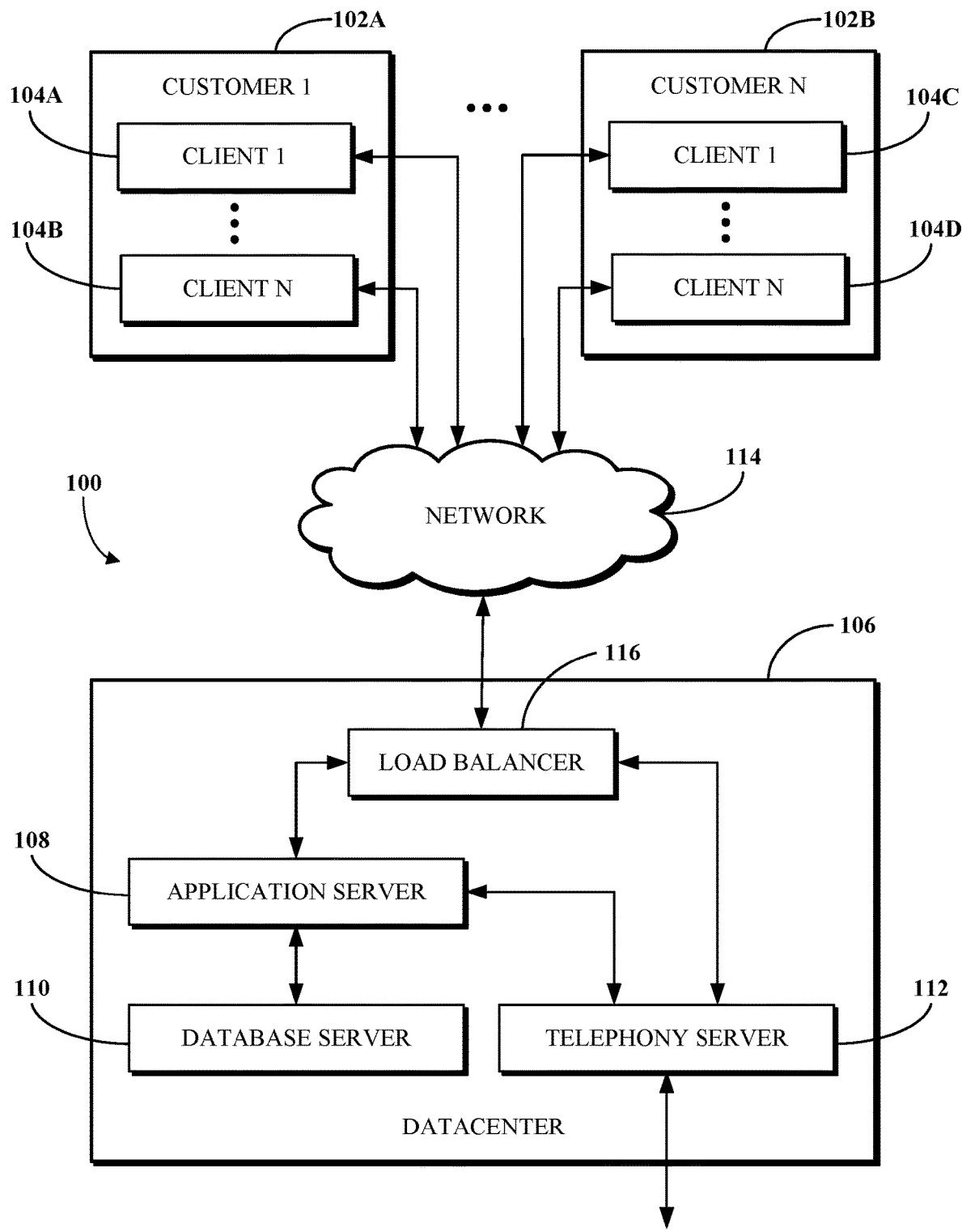
FIG. 1 is a block diagram of an example of an electronic computing and communications system.

Enterprise entities rely upon several modes of communication to support their operations, including telephone, email, and internal messaging. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them.

In telephony services, such as those implemented over a Unified Communications as a Service (UCaaS) platform or other software platform, a client device may connect to a datacenter. The datacenter handles telephony services for the client device and allows the client device to connect to the public switched telephone network (PSTN). At some point, a telephony outage (e.g., affecting the datacenter or a network used for telephony services) may prevent the client device from accessing the datacenter. During the telephony outage, the client device might not be able to access some or all of the telephony services. This service disruption may result in a considerable negative impact to users. Techniques for allowing the client device to access telephony services during the telephony outage may thus be desirable.

Implementations of this disclosure address problems such as these to allow telephony services to survive at a telephony customer premises during a wide telephony outage using a telephony node at the customer premises. A telephony outage condition is determined based on (1) a client-side determination that a client device is at the customer premises and incapable of communicating with a server at a datacenter, and (2) a telephony node-side determination that the telephony node is at the customer premises and incapable of communicating with a server at a datacenter (the same or a different server). In response to the client device attempting to reconnect to telephony services during the telephony outage, an encrypted password which is stored at the client device is transmitted from the client device to the telephony node, which decrypts the password and uses the same to authenticate telephony service access by the client device. The client device may then use the telephony node as an intermediary to use the telephony services during the telephony outage. As used herein, a telephony node may provide telephony services. In some cases, the telephony node may also provide functionality other than telephony services, such as Internet access or local data access. A telephony node may also be referred to as a "node."

While using the telephony node as the intermediary, the client device may be able to use all or a subset of the services provided by the datacenter, depending on the configuration of the client device or the telephony node. In one example, the telephony node may be a "thin" telephony node that provides intra-office calling functionality and access to the PSTN. Other services, such as call recording, online meeting creation, and automated receptionist service might not be available until the client device is able to reconnect to the datacenter. Alternatively, the telephony node may be a "thick" telephony node that provides some or all of the services of the datacenter. These services may be provided by software residing at the telephony node and/or software residing locally at the client device.

The password may be a single sign-on (SSO) password of the client device for connecting to the telephony node and/or the datacenter. The password may be stored at the client device, such that the client device may automatically (e.g., without user input or with minimal user input, such as the user selecting a button) connect to the telephony node upon detecting the telephony outage or datacenter unavailability. In some examples, the password is stored in a password manager (e.g., Windows® Credential Manager or iCloud Keychain®) at the client device. Alternatively, the user may manually type the password in order to connect to the telephony node.

The implementations of this disclosure are described herein in connection with telephony outages. However, the implementations of this disclosure may be expanded to cover any network or Internet outages. Accordingly, use cases for the implementations of this disclosure are not limited to telephony outages.

Implementations of this disclosure describe using a single telephony node or multiple telephony nodes. The telephony nodes may be on-premises telephony nodes residing at a customer's premises. Different telephony nodes can provide different services, depending on the configuration selected. For example, one telephony node may handle PSTN calls and another telephony node may handle video conferencing between on-premises devices. Alternatively, two or more telephony nodes may provide the same services. In such a case, load balancing may be implemented between multiple telephony nodes to improve user experience, improve functionality, and/or reduce latency.

In some implementations, the user may be informed of the telephony outage via a display unit of the client device. For example, the user may be shown a text box saying that a telephony outage is occurring, and that the client device is attempting to connect to the telephony node. In some implementations, the user may be informed of the telephony outage when he/she tries to use telephony services and is told that the telephony services are not available. This information may be provided via the display or via an audio output when the user tries to access telephony services, for example, by dialing a telephone number.

In most cases, the telephony outage is resolved at some point after it is detected. After the telephony outage is resolved, telephony services may be provided to the client device by the datacenter. In particular, telephony services by the telephony node may be stopped to allow the client device to begin re-using the subject datacenter for telephony services. Alternatively, there may be load balancing between the datacenter and the telephony node, as described herein, to enable telephony services to be provided by both the telephony node and the datacenter. In some implementations, the telephony node, and not the datacenter, may continue providing telephony services to the client device for some period of time or based on an ongoing call after the telephony outage is resolved. For example, the telephony node may continue to provide telephony services for an ongoing call to prevent interruption during the ongoing call, it being noted that there may be an interruption if an ongoing call is handed over from the telephony node to the datacenter. In some implementations, the user of the client device may receive a notification indicating the restoration of telephony services after the telephony outage is resolved, such as based on the client device and/or the telephony node successfully connecting to the datacenter.

To describe some implementations in greater detail, reference is first made to examples of hardware and software structures used to implement telephony outage handling using a telephony node. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a PSTN system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
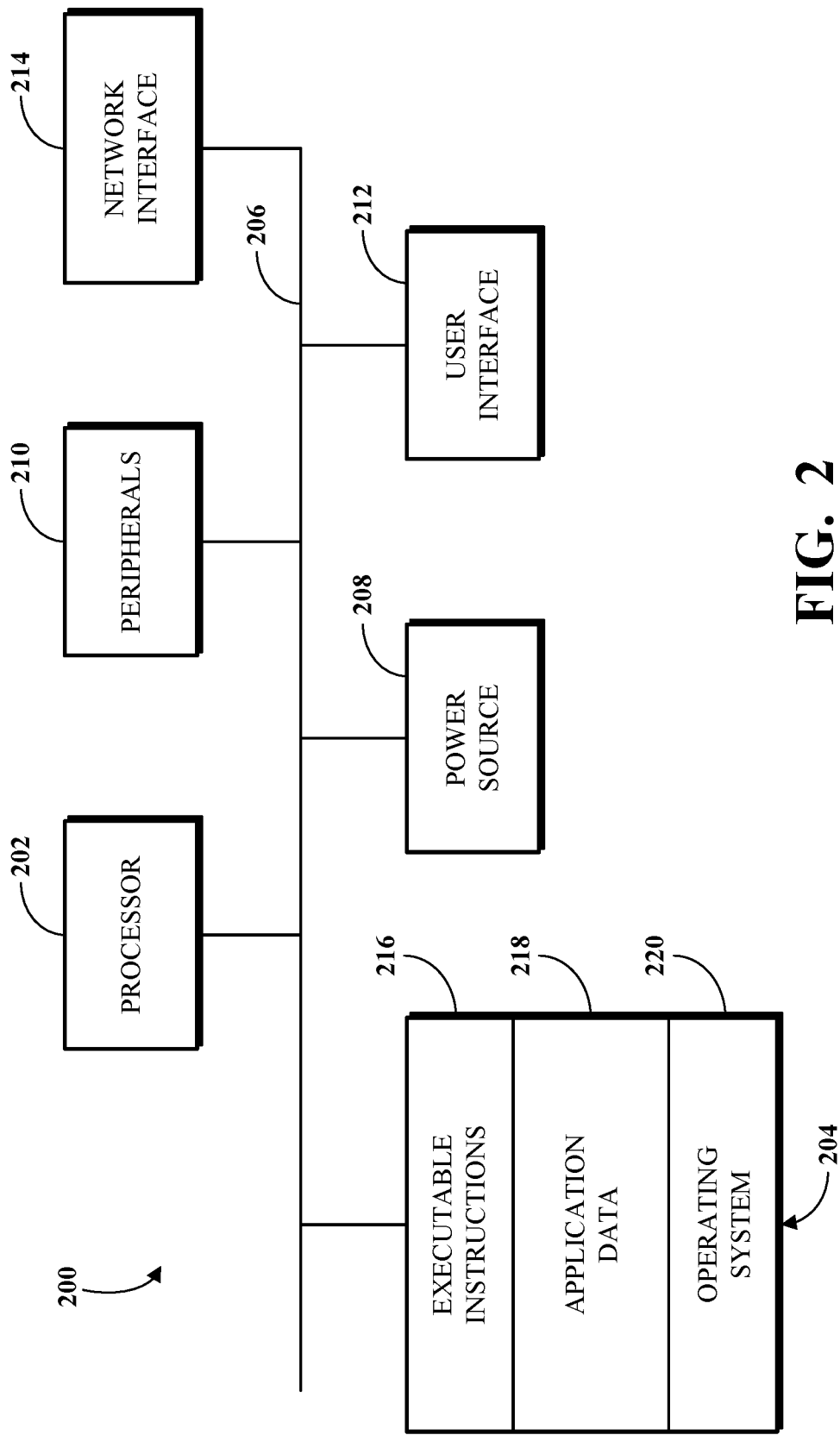
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
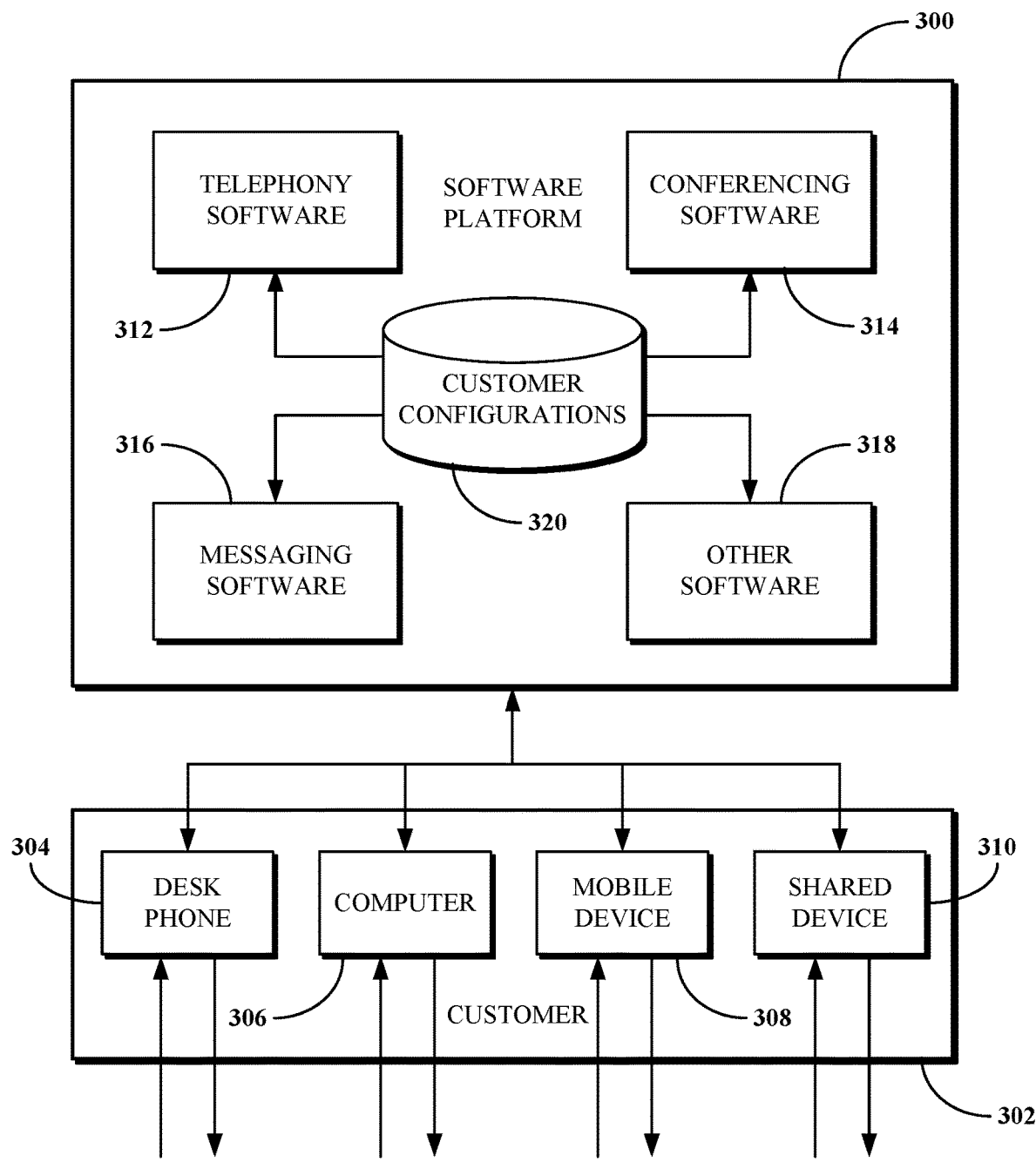
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for handling a telephony outage and/or software for load balancing.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
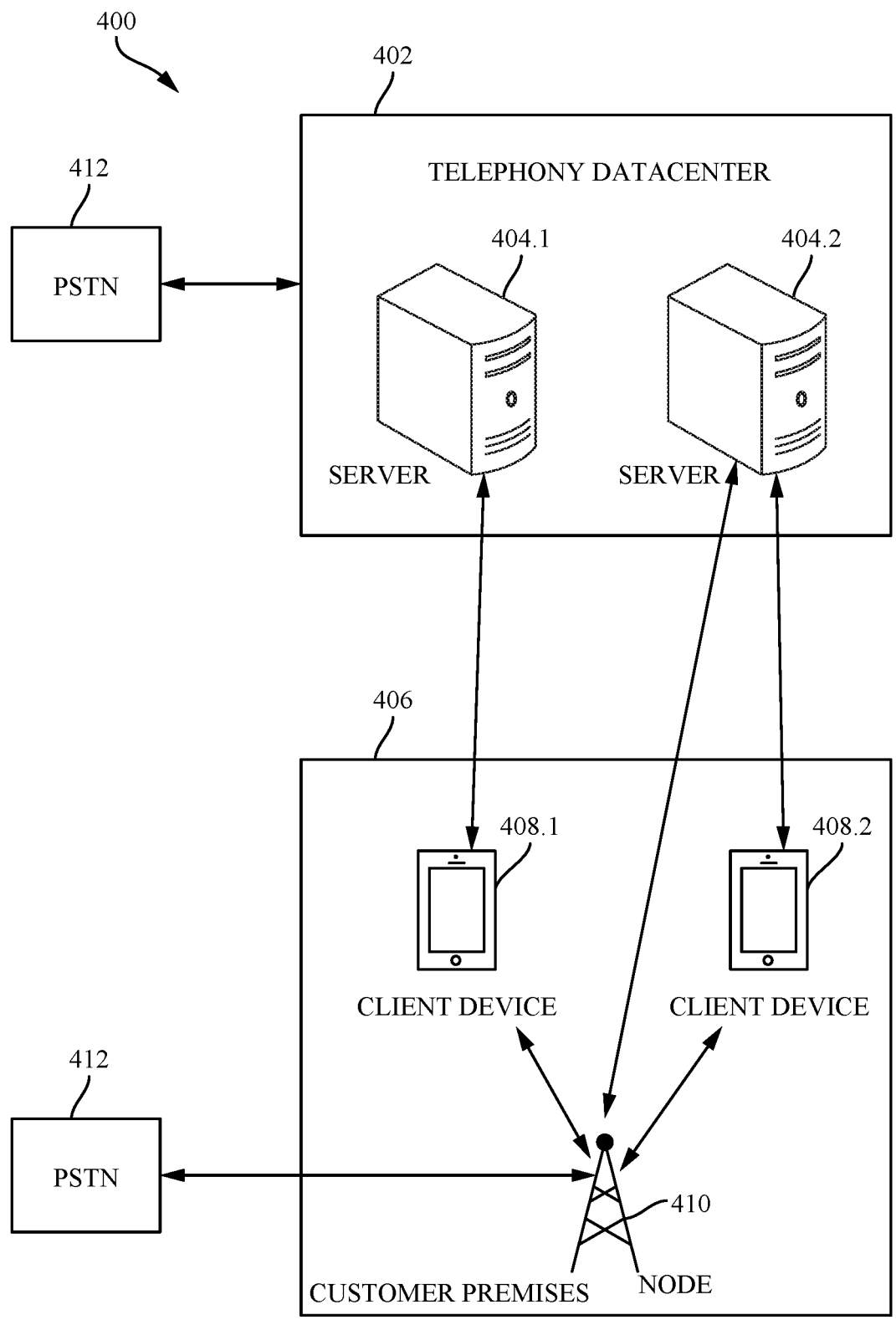
FIG. 4 illustrates an example system in which handling a telephony outage may be implemented.

FIG. 4 illustrates an example system 400 in which handling a telephony outage may be implemented. As shown, the system 400 includes a datacenter 402 and a customer premises 406. The datacenter 402 may correspond to the datacenter 106. The customer premises 406 may correspond to one of the customers 102A through 102B. The customer premises may be an office space, a shared co-working space, an apartment complex or another space where multiple client devices may be connected with one or multiple telephony nodes.

As shown, the datacenter includes servers 404. While two servers 404.1 and 404.2 are illustrated, some implementations disclosed herein may be implemented with other numbers of servers 404. Each of the servers 404 may correspond to at least one of the clients 104A, 104B, 104C or 104D. The datacenter 402 is connected to the PSTN 412 and is capable of processing incoming or outgoing telephone calls via the PSTN 412.

As illustrated, the customer premises 406 includes client devices 408 and a telephony node 410. While two client devices 408.1 and 408.2 are illustrated, some implementations may use other numbers of client devices 408. As shown, each client device 408 is connected to at least one server 404 in the datacenter 402, with different client devices 408 potentially being connected to different servers 402. The telephony node 410 is connected to one or both of the servers 404 in the datacenter 402. The telephony node 410 is connected to the PSTN 412 for processing incoming and/or outgoing telephone calls via the PSTN 412.

At some point, a telephony outage occurs, which wholly or partially disrupts telephony services previously accessible to the client devices 408. In some cases, the client device 408.1 (or another client device 408) determines that a telephony outage is occurring. In some cases, the telephony node 410 may also or instead determine that the telephony outage is occurring. The client device 408 and/or the telephony node 410, as applicable, may determine that the telephony outage is occurring based on an inability to connect with the server 404 in the datacenter 402. In response to determining that the telephony outage is occurring, the client device 408.1 attempts to connect to the telephony node 410 (or at least one of multiple telephony nodes) using an encrypted password stored at the client device 408.1.

The telephony node 410 receives the encrypted password from the client device 408.1 attempting to connect with the telephony node 410 to access telephony services. The telephony node 410 decrypts the password. The telephony node 410 authenticates the password. In response to authenticating the password, the telephony node 410 provides access to telephony services for the client device 408.1. The client device 408.1 may thus access a set of telephony services via the telephony node 410. The set of telephony services may include, for example, access to the PSTN 412 and voice, chat or video conferencing with other on-premises devices.

In some implementations, when there is no telephony outage and the client devices 408 are able to communicate with both the telephony node 410 and the datacenter 402, load balancing may be implemented between the servers 404 and the telephony nodes 410. The load balancing may be based on the pre-existing load on the servers 404 or the telephony node 410 or based on capabilities of the servers 404 or the telephony node 410. The load balancing may be implemented during times of peak telephony usage (e.g., during business hours).

Figure 5:
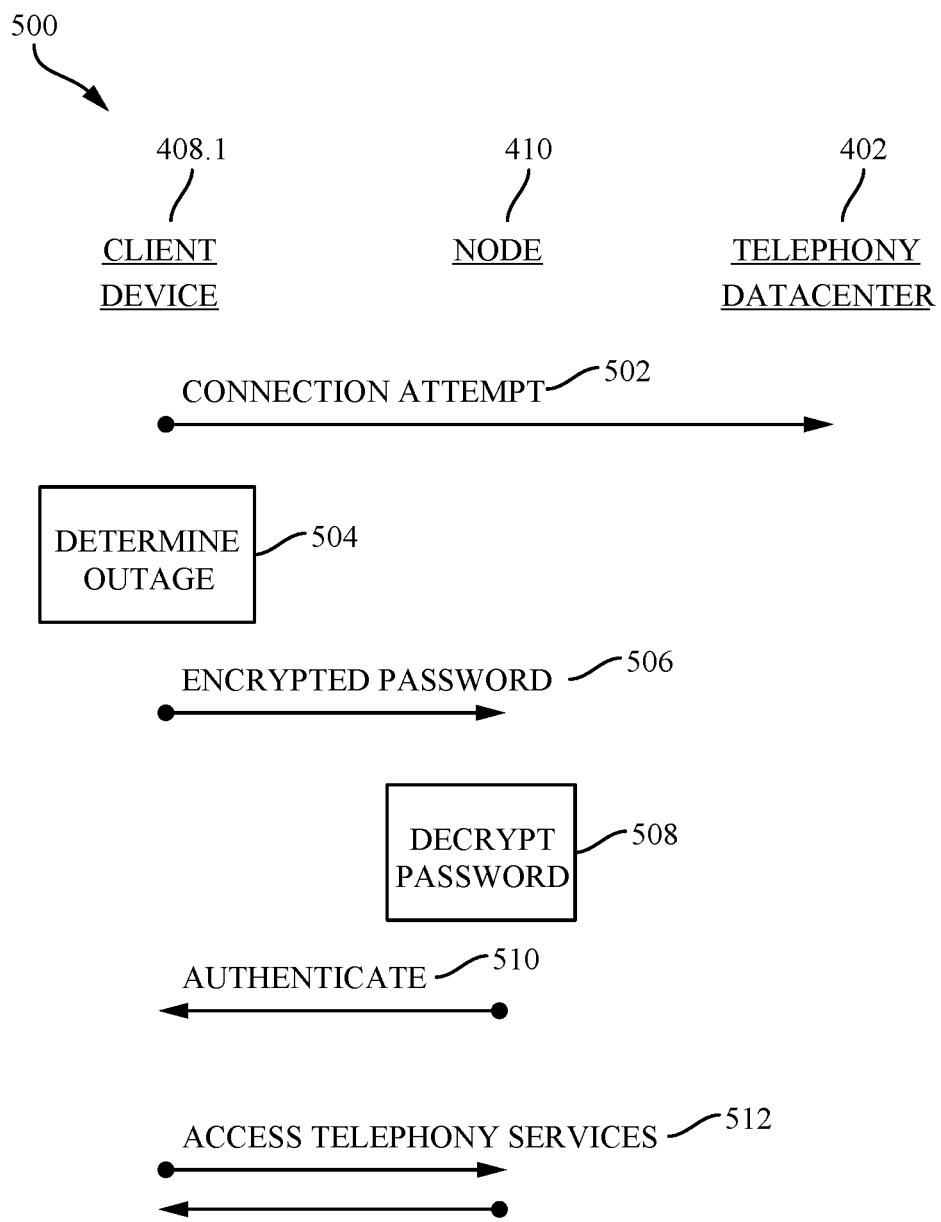
FIG. 5 is a data flow diagram of an example of a sequence of operations for handling a telephony outage.

FIG. 5 is a data flow diagram of an example of a sequence 500 of operations for handling a telephony outage. As shown, the sequence 500 is implemented using the client device 408.1, the telephony node 410, and the datacenter 402 of FIG. 4.

At block 502, the client device 408.1 attempts to connect to the datacenter 402 (e.g., to the server 404.1 in the datacenter 402). The attempt by the client device 408.1 may be made in response to an attempt, by a user of the client device 408.1, to access telephony services using the client device 408.1. Upon failing to connect to the datacenter 402 after a predefined time period (e.g., 0.5 seconds or 1 second) of the attempt by the client device 408.1, the client device 408.1 determines that it cannot connect to the datacenter 402. In at least some cases, the telephony node 410 may also attempt to connect to the datacenter 402 and fail to connect during the predefined time period.

At block 504, based on the attempt to connect to the datacenter 402 failing, the client device 408.1 determines that a telephony outage is happening. Similarly, whether concurrent with the telephony outage determination by the client device 408.1 or otherwise, the telephony node 410 determines that a telephony outage is happening based on its attempt to connect to the datacenter 402 failing. In some cases, after determining that the telephony outage is happening, the client device 408.1 may attempt to connect to telephony services in other ways (e.g., using other networking or connection techniques). For example, if the telephony outage is due to an outage in Wi-Fi® services, the client device 408.1 may attempt to connect to telephony services over a cellular connection or a wired connection (if available).

At block 506, based on a determination by the client device 408.1 that the telephony outage is happening, the client device 408.1 transmits an encrypted password to the telephony node 410. In some implementations, the client device 408.1 pushes the encrypted password to the telephony node 410. The client device 408.1 may transmit the encrypted password to the telephony node 410 via a local network of the premises, for example, a local wired network or a local Wi-Fi® network. The encrypted password may be transmitted using any encryption technique, for example Diffie-Hellman encryption may be used.

At block 508, the telephony node 410 decrypts the password received from the client device 408.1. In some implementations, the telephony node 410 always decrypts the password. In some implementations, the telephony node 410 decrypts the password if it is unable to connect with the datacenter. Otherwise, the telephony node 410 notifies (e.g., by transmitting a message over the local network of the premises) the client device that the datacenter is available for connection. At block 510, the telephony node 410 authenticates the client device 408.1 based on the decrypted password. The authentication verifies that the client device 408.1 has permission to access telephony services via the telephony node 410 based on the password. In some implementations, the password for connecting with the telephony node 410 is different from the password for connecting with the datacenter because, when the client device 408.1 tries to connect to the telephony node 410, the datacenter might be unavailable to verify the password. For example, the datacenter may be offline.

At block 512, the client device 408.1 accesses telephony services via the telephony node 410. Accessing telephony services may entail two-way communication between the client device 408.1 and the telephony node 410. The accessed telephony services may include some or all of the telephony services that are provisioned by the telephony node 410, such as access to PSTN calls and intra-office virtual meetings.

Figure 6:
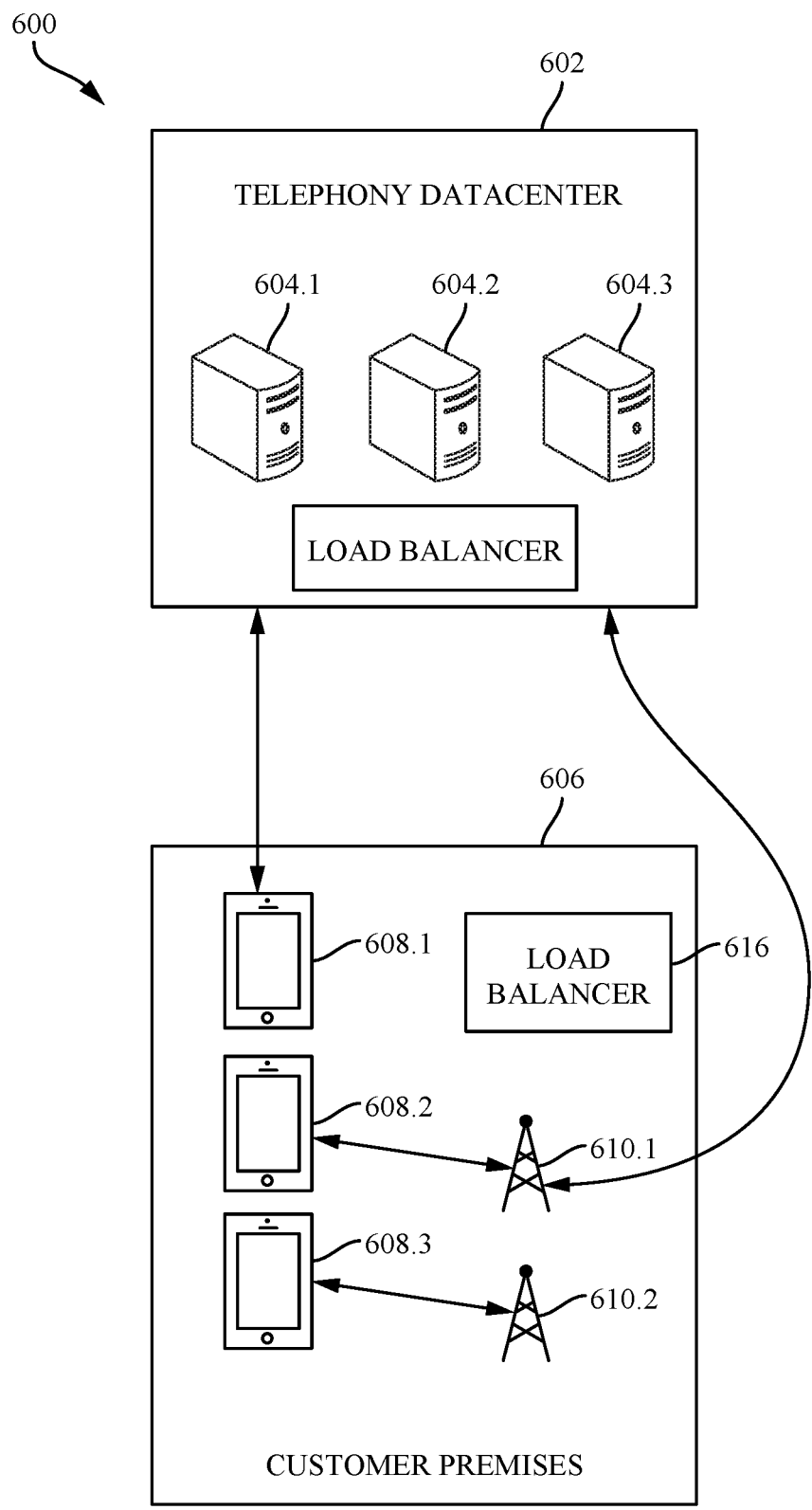
FIG. 6 illustrates an example system in which telephony load balancing may be implemented.

FIG. 6 illustrates an example system 600 in which telephony load balancing may be implemented. As shown, the system 600 includes a datacenter 602 (e.g., corresponding to datacenter 402) and a customer premises 606 (e.g., corresponding to customer premises 406). As shown in FIG. 6, during time periods of high telephony usage, the telephony load may be balanced between servers at the datacenter 602 and telephony nodes at the customer premises 606. The implementations shown in FIG. 6 may reduce a likelihood of overloading (e.g., exceeding 95% of cache or processor usage) the servers at the datacenter 602 or the telephony nodes at the customer premises 606.

The datacenter 602 includes multiple servers 604 (e.g., three servers 604.1, 604.2, and 604.3 as shown or another number of servers) and a load balancer 614. The load balancer 614 balances load (e.g., on processors, memory, and network interfaces) between the servers 604. The load balancer 614 may reside on one or more of the servers 604 or on another computing machine of the datacenter 602.

The customer premises 606 includes multiple client devices 608 (e.g., three client devices 608.1, 608.2, and 608.3 as shown or another number of client devices) and multiple telephony nodes 610 (e.g., two telephony nodes 610.1 and 610.2 as shown or another number of telephony nodes). The customer premises 606 also includes a load balancer 616. The load balancer 616 balances load (e.g., on processors, memory, and network interfaces) between the telephony nodes 610. The load balancer 616 may reside on one or more of the telephony nodes 610, on a client device 608 or another computing machine located at the customer premises 606.

In implementations with multiple telephony nodes 610, load balancing could be implemented between the telephony nodes 610 using the load balancer 616. In some implementations, different telephony nodes 610 provide different services. For example, one telephony node 610.1 may handle PSTN calls and another telephony node 610.2 may handle video conferencing between on-premises devices. In some implementations, each of the telephony nodes 610 provides the same services and loads are balanced between the telephony nodes 610 to ensure that no telephony node 610 is overloaded (e.g., using more than 90% of its processing power, memory, cache, and network interface).

Similarly, at the datacenter 602, different servers 604 may be responsible for different functions. For example, one server 604 may be responsible for handling video conferences and another server 604 may be responsible for handling an automated receptionist service. Alternatively, multiple servers 604 may provide the same services and loads may be balanced between the servers 604 to ensure that no server 604 is overloaded (e.g., using more than 90% of its processing power, memory, cache, and network interface).

When the datacenter 602 is accessible to the client device 608 and the telephony node 610 of the customer premises 606, load balancing may be implemented between the datacenter 602 and the telephony node 610, for example, using the load balancer 614 of the datacenter 602, the load balancer 616 of the customer premises or a combination of the load balancers 614 and 616. For example, during low usage times, all telephony services may be provided to the client devices 608 using the datacenter 602. During high usage times, the datacenter 602 could handle, on behalf of the client device 608, use cases that cannot be accomplished using the telephony node 610, such as online meetings or automated receptionist service. The telephony node 610 could be used to handle, on behalf of the client device 608, features such as PSTN calls that do not require the involvement of the datacenter 602. Alternatively, if many PSTN calls are occurring simultaneously, the handling of the PSTN calls may be split between the servers 604 of the datacenter 602 and the telephony node 610.

Figure 7:
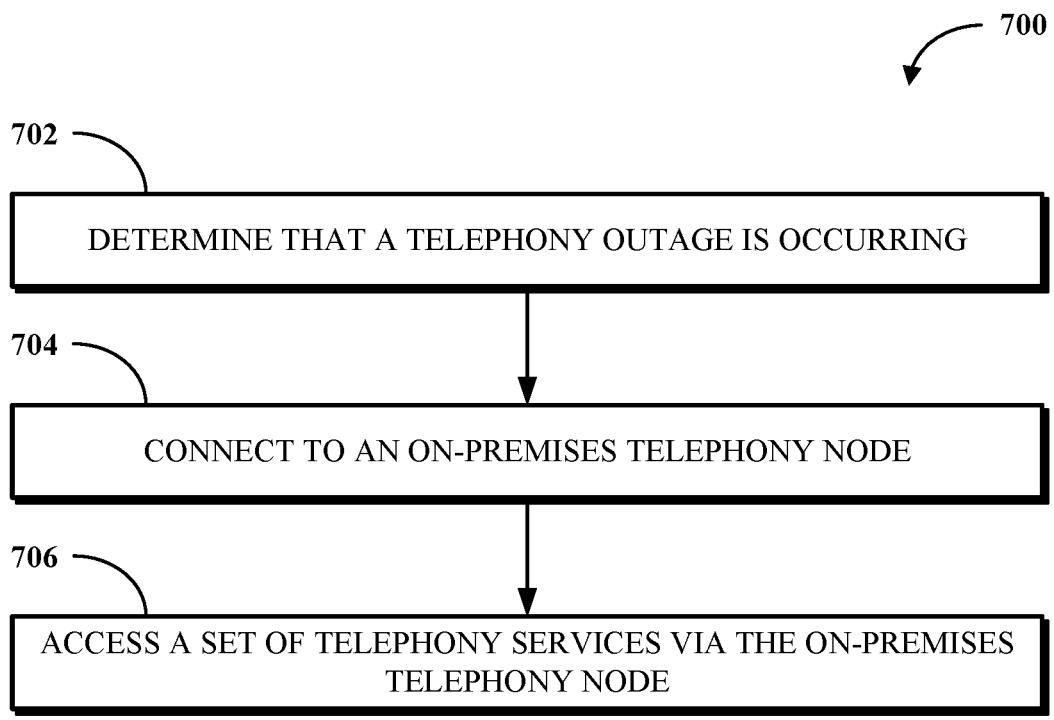
FIG. 7 is a flowchart of an example of a technique for handling a telephony outage.
Figure 8:
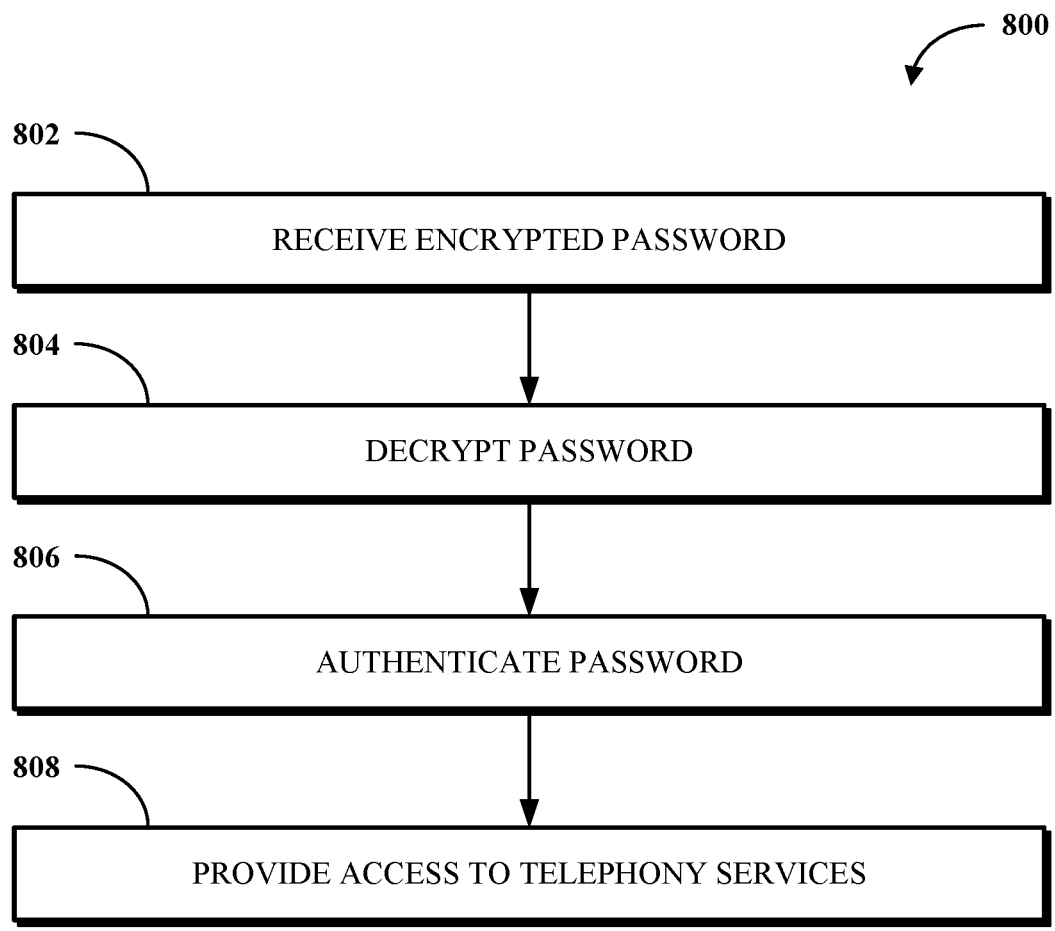
FIG. 8 is a flowchart of an example of a technique for a telephony node to provide telephony services.
Figure 9:
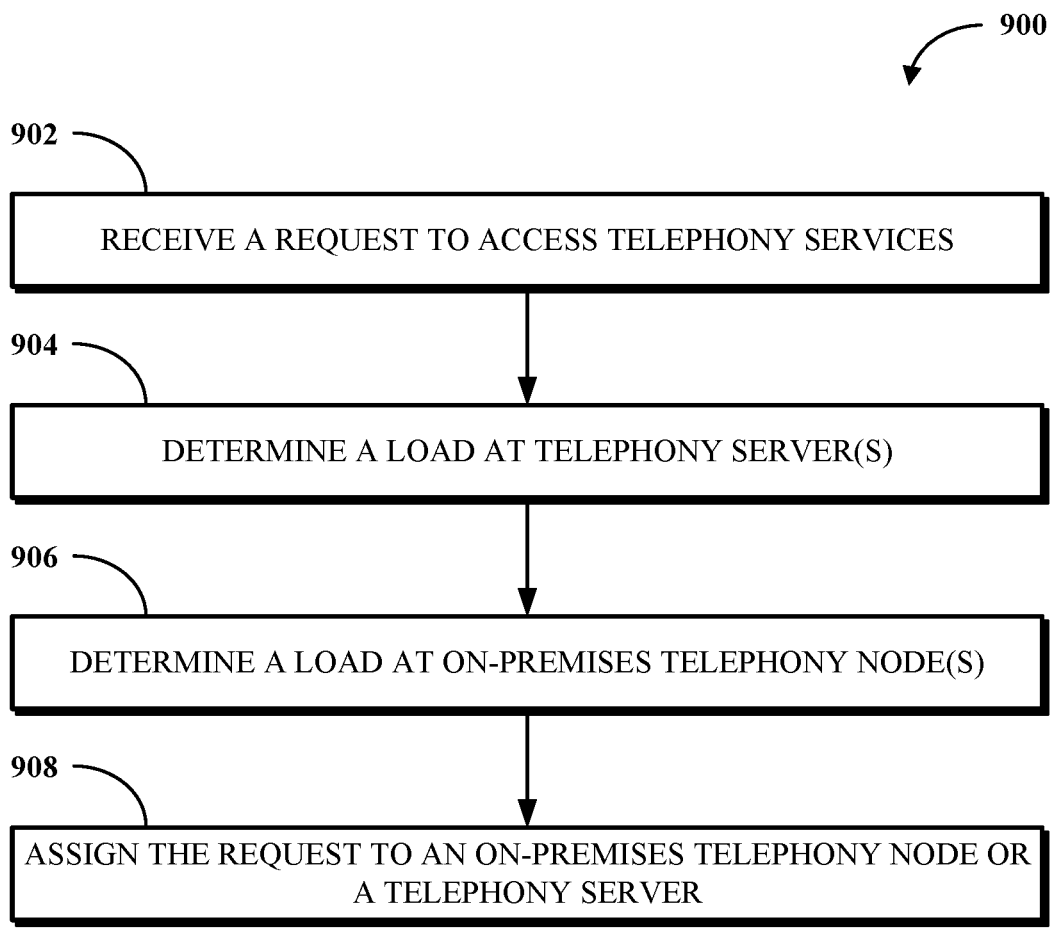
FIG. 9 is a flowchart of an example of a technique for telephony load balancing.

To further describe some implementations in greater detail, reference is next made to examples of techniques which may be performed by telephony outage handling using an on-premises telephony node. FIG. 7 is a flowchart of an example of a technique 700 for handling a telephony outage. FIG. 8 is a flowchart of an example of a technique 800 for a telephony node to provide telephony services. FIG. 9 is a flowchart of an example of a technique 900 for telephony load balancing.

The techniques 700, 800, and 900 can be executed using computing devices, such as the systems, hardware, and software described with respect to FIGS. 1-6. The techniques 700, 800, and 900 can be performed, for example, by executing a machine-readable program or other computer-executable instructions, such as routines, instructions, programs, or other code. The steps, or operations, of the techniques 700, 800, 900 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 is shown. At block 702, a client device (e.g., the client device 408 or 608) and/or a telephony node (e.g., the telephony node 410 or 610) at a customer premises 406 or 606 determines that a telephony outage is occurring. For example, the client device and/or the telephony node may determine that the client device and/or the telephony node is incapable of connecting to a server (e.g., the server 404 or 604) at the datacenter (e.g., the datacenter 402 or 602). In some implementations, this occurs when the client device attempts to access telephony services via the server but is unable to do so. At approximately the same time (e.g., within 5 seconds) the telephony node attempts to access telephony services via the server but is unable to do so.

At block 704, the client device connects to the telephony node using an encrypted password at a client device. In some implementations, the client device connects to the telephony node in response to an attempt to access telephony services at the client device and a determination at the client device that a telephony outage is ongoing (e.g., due to failure to connect to the server). The client device may transmit the encrypted password to the telephony node for decryption and authentication thereat, for example, as described in conjunction with FIG. 8. The password may be an SSO password of the client device for connecting to the telephony node and/or the datacenter. Based on the telephony node determining that the telephony outage is ongoing (in addition to the similar determination at the client device), the telephony node decodes the password and authenticates the password to allow the client device to access the telephony services through the telephony node.

At block 706, the client device accesses a set of telephony services via the telephony node. While using the telephony node as the intermediary, the client device may be able to use all or a subset of the services provided by the datacenter when the telephony outage is not occurring. The services provided while using the telephony node may depend on the configuration of the client device or the telephony node. In some examples, the telephony node is a "thin" telephony node that provides a subset of the services provided by the datacenter. The subset may include, for example, intra-office calling functionality and access to the PSTN (e.g., PSTN 412). Other services, such as call recording, online meeting creation, and automated receptionist service might not be available until the client device is able to reconnect to the datacenter. Alternatively, in a "thick" telephony node implementation, the telephony node may include similar software to the datacenter. All of the services typically provided by the datacenter may then be provided by software residing at the telephony node and/or software residing locally at the client device. In one implementation, the set of telephony services provided by the telephony node includes intra-office calling and access to the PSTN and does not include at least one of call recording, online meeting creation, or automated receptionist service.

In some implementations, upon connection to the telephony node, the telephony node transmits a message notifying a user of the client device of unavailability of a collection of telephony services. The telephony node may provide a replacement telephony service for one or more services in the collection of telephony services.

Referring next to FIG. 8, the technique 800 is shown. At block 802, the telephony node receives an encrypted password from a client device (e.g., client device 408 or 608). In some cases, the client device attempts to access telephony services and, upon failing to connect to the datacenter, attempts to connect to the telephony node using the password.

At block 804, the telephony node decrypts the password. Multiple different decryption techniques may be used to decrypt the password. For example, the Diffie-Hellman encryption algorithm may be used. Alternatively, Rivest-Shamir-Adleman (RSA) encryption or elliptic curve cryptography may be used.

At block 806, the telephony node authenticates the decrypted password. For example, the telephony node verifies that the client device attempting to connect to the telephony node has permission to access telephony services via the telephony node. The telephony node may store a data structure indicating client devices that are permitted to access telephony services through the telephony node.

At block 808, the telephony node provides telephony services to the client device. The available telephony services may be determined based on a configuration of the telephony node and/or a configuration of the client device. In some examples, the available telephony services may include access to the PSTN. If the client device is configured for video calling, the available services may include intra-premises video calling.

Referring last to FIG. 9, the technique 900 is shown. At block 902, a load balancer (e.g., load balancer 614, load balancer 616 or a combination of load balancers 614 and 616) receives a request to access telephony services. The request to access telephony services may be from a client device (e.g., client device 608). The request may be generated by a user attempting to access a telephony service via the client device. Alternatively, the client device may access telephony services without input from a user of the client device, for example, in response to an incoming telephone call or audio/video conferencing request.

At block 904, the load balancer determines a load at telephony servers (e.g., the servers 604 at the datacenter 602). The load may be determined using any load measuring technique. For example, the load balancer may send, to the telephony servers, messages to determine what percentages of their processors and cache memory are being used.

At block 906, the load balancer determines a load at the telephony node(s). Various known load determination techniques may be used. For example, the load balancer may send, to the telephony nodes, messages to determine what percentages of their processors and cache memory are being used.

At block 908, the load balancer assigns the request (received at the block 902) to access telephony services to a telephony node or a telephony server. The request may be assigned based on technical capability to fulfill the request and/or a current load of the telephony node or the telephony server fulfilling the request. The load balancer may ensure that the load is below a threshold, where the threshold is determined based on loads on other telephony nodes or telephony servers. The load balancer may ensure that the telephony node or the telephony server includes software or hardware for fulfilling the request. For example, if the request is associated with a video conference with parties outside the premises, the load balancer may ensure that the telephony node or the telephony server is capable of handling such a video conference.

The techniques 700, 800, and 900 are described as being implemented in series and in a given order. Alternatively, two or more of the operations in the techniques 700, 800 or 900 may be performed in parallel. In some cases, the operations of the techniques 700, 800 or 900 may be performed in a different order from the specified order.

The techniques 700, 800, and 900 may be used separately from one another and/or in conjunction with one another. For example, the technique 700 relates to a client device detecting a telephony outage (due to the client device's inability to connect to the server) and, in response to detecting the telephony outage, connecting to telephony services via the telephony node. The technique 800 relates to the telephony node receiving a password from the client device and, based on the password, authenticating the client device for accessing telephony services via the telephony node. The technique 900 relates to load balancing between servers at the datacenter and telephony nodes at the customer premises when both are available for providing telephony services.

Combinations of the techniques 700, 800, and 900 describe the processes for delivering telephony services over a telephony node (e.g., located on-premises at a customer premises) based on a telephony outage. In particular, at some point after a telephony outage affecting telephony services delivered by a datacenter begins, a client device of a user attempts to connect to the datacenter to use a subject telephony service. The client device is unable to connect to the datacenter based on that attempt. The telephony node also attempts to connect to the datacenter and is unable to. Based on the client device being unable to connect to the datacenter, the client device pushes an encrypted password, usable to authenticate access to telephony services at the telephony node by the client device, to the telephony node. Based on the telephony node being unable to connect to the datacenter, the telephony node decrypts and uses the password pushed from the client device to authenticate access to the telephony services at the telephony node by the client device. The client device thus accesses the telephony services via the telephony node.

Some implementations are described below as numbered examples (Example 1, 2, 3, etc.). These examples are provided as exampled only and do not limit the disclosed implementations.

Example 1 is a method comprising: determining that a telephony outage is occurring; connecting to an on-premises telephony node using an encrypted password at a client device; and accessing a set of telephony services at the client device via the on-premises telephony node.

In Example 2, the subject matter of Example 1 includes, wherein determining that the telephony outage is occurring comprises: determining that the client device is incapable of connecting to a server; and determining that the on-premises telephony node is incapable of connecting to the server.

In Example 3, the subject matter of Examples 1-2 includes, wherein connecting to the on-premises telephony node comprises: transmitting the encrypted password from the client device to the on-premises telephony node; and receiving a response from the on-premises telephony node indicating that access to the telephony services is granted.

In Example 4, the subject matter of Examples 1-3 includes, wherein the set of telephony services comprises a portion of telephony services accessible when the telephony outage is not occurring.

In Example 5, the subject matter of Examples 1-4 includes, wherein the set of telephony services includes intra-office calling and access to a public switched telephone network and does not include at least one of call recording, online meeting creation, or automated receptionist service.

In Example 6, the subject matter of Examples 1-5 includes, receiving a notification of unavailability of a second set of telephony services at the client device; and preventing access to the second set of telephony services at the client device.

In Example 7, the subject matter of Examples 1-6 includes, wherein connecting to the on-premises telephony node using the encrypted password at the client device comprises: pushing the encrypted password from the client device to the on-premises telephony node.

Example 8 is an apparatus comprising: a memory; and a processor configured to execute instructions stored in the memory to: determine that a telephony outage is occurring; connect to an on-premises telephony node using an encrypted password at a client device; and access a set of telephony services at the client device via the on-premises telephony node.

In Example 9, the subject matter of Example 8 includes, wherein determining that the telephony outage is occurring comprises: determining that the client device is incapable of connecting to a server; and determining that the on-premises telephony node is incapable of connecting to the server.

In Example 10, the subject matter of Examples 8-9 includes, wherein connecting to the on-premises telephony node comprises: transmitting the encrypted password from the client device to the on-premises telephony node; and receiving a response from the on-premises telephony node indicating that access to the telephony services is granted.

In Example 11, the subject matter of Examples 8-10 includes, wherein the set of telephony services comprises telephony services accessible when the telephony outage is not occurring.

In Example 12, the subject matter of Examples 8-11 includes, wherein the set of telephony services includes access to a public switched telephone network.

In Example 13, the subject matter of Examples 8-12 includes, wherein the client device determines that the telephony outage is occurring by failing to connect to a server.

In Example 14, the subject matter of Examples 8-13 includes, wherein connecting to the on-premises telephony node is in response to an attempt to access the set of telephony services at the client device.

Example 15 is a computer-readable medium storing instructions operable to cause one or more processors to perform operations comprising: determining that a telephony outage is occurring; connecting to an on-premises telephony node using an encrypted password at a client device; and accessing a set of telephony services at the client device via the on-premises telephony node.

In Example 16, the subject matter of Example 15 includes, wherein determining that the telephony outage is occurring comprises: determining that the client device is incapable of connecting to a server; and determining that the on-premises telephony node is incapable of connecting to the server.

In Example 17, the subject matter of Examples 15-16 includes, wherein connecting to the on-premises telephony node comprises: transmitting the encrypted password from the client device to the on-premises telephony node; and receiving a response from the on-premises telephony node indicating that access to the telephony services is granted.

In Example 18, the subject matter of Examples 15-17 includes, wherein the on-premises telephony node is connected to the client device via a local network of a premises.

In Example 19, the subject matter of Examples 15-18 includes, wherein the set of telephony services includes intra-office calling.

In Example 20, the subject matter of Examples 15-19 includes, wherein the client device stores the encrypted password for accessing the set of telephony services via the on-premises telephony node and an additional password for accessing a second set of telephony services via a datacenter.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   determining that a telephony outage is occurring;
   connecting to an on-premises telephony node using an encrypted password at a client device; and
   accessing a set of telephony services at the client device via the on-premises telephony node, wherein the set of telephony services does not include at least one of call recording, online meeting creation, or automated receptionist service, wherein the at least one of the call recording, the online meeting creation, or the automated receptionist service is available, via a server, when the telephony outage is not occurring.

2. The method of claim 1, wherein determining that the telephony outage is occurring comprises:
   determining that the client device is incapable of connecting to the server; and
   determining that the on-premises telephony node is incapable of connecting to the server.

3. The method of claim 1, wherein connecting to the on-premises telephony node comprises:
   transmitting the encrypted password from the client device to the on-premises telephony node; and
   receiving a response from the on-premises telephony node indicating that access to the telephony services is granted.

4. The method of claim 1, wherein the set of telephony services comprises a portion of telephony services accessible when the telephony outage is not occurring.

5. The method of claim 1, wherein the set of telephony services includes intra-office calling and access to a public switched telephone network.

6. The method of claim 1, further comprising:
   receiving a notification of unavailability of a second set of telephony services at the client device; and
   preventing access to the second set of telephony services at the client device.

7. The method of claim 1, wherein connecting to the on-premises telephony node using the encrypted password at the client device comprises:
   pushing the encrypted password from the client device to the on-premises telephony node.

8. A system comprising:
   memory hardware; and
   one or more processors configured to execute instructions stored in the memory hardware to:
   determine that a telephony outage is occurring;
   connect to an on-premises telephony node using an encrypted password at a client device; and
   access a set of telephony services at the client device via the on-premises telephony node, wherein the set of telephony services does not include at least one of call recording, online meeting creation, or automated receptionist service, wherein the at least one of the call recording, the online meeting creation, or the automated receptionist service is available, via a server, when the telephony outage is not occurring.

9. The system of claim 8, wherein determining that the telephony outage is occurring comprises:
   determining that the client device is incapable of connecting to the server; and
   determining that the on-premises telephony node is incapable of connecting to the server.

10. The system of claim 8, wherein connecting to the on-premises telephony node comprises:
    transmitting the encrypted password from the client device to the on-premises telephony node; and receiving a response from the on-premises telephony node indicating that access to the telephony services is granted.

11. The system of claim 8, wherein the set of telephony services comprises telephony services accessible when the telephony outage is not occurring.

12. The system of claim 8, wherein the set of telephony services includes access to a public switched telephone network.

13. The system of claim 8, wherein the client device determines that the telephony outage is occurring by failing to connect to the server.

14. The system of claim 8, wherein connecting to the on-premises telephony node is in response to an attempt to access the set of telephony services at the client device.

15. At least one non-transitory computer-readable medium storing instructions operable to cause one or more processors to perform operations comprising:
 determining that a telephony outage is occurring;
 connecting to an on-premises telephony node using an encrypted password at a client device; and
 accessing a set of telephony services at the client device via the on-premises telephony node, wherein the set of telephony services does not include at least one of call recording, online meeting creation, or automated receptionist service, wherein the at least one of the call recording, the online meeting creation, or the automated receptionist service is available, via a server, when the telephony outage is not occurring.

16. The at least one computer-readable medium of claim 15, wherein determining that the telephony outage is occurring comprises:
 determining that the client device is incapable of connecting to the server; and
 determining that the on-premises telephony node is incapable of connecting to the server.

17. The at least one computer-readable medium of claim 15, wherein connecting to the on-premises telephony node comprises:
 transmitting the encrypted password from the client device to the on-premises telephony node; and
 receiving a response from the on-premises telephony node indicating that access to the telephony services is granted.

18. The at least one computer-readable medium of claim 15, wherein the on-premises telephony node is connected to the client device via a local network of a premises.

19. The at least one computer-readable medium of claim 15, wherein the set of telephony services includes intra-office calling.

20. The at least one computer-readable medium of claim 15, wherein the client device stores the encrypted password for accessing the set of telephony services via the on-premises telephony node and an additional password for accessing a second set of telephony services via a datacenter.

\* \* \* \* \*